United States Patent [19]

Kawasaki et al.

[11] 4,371,864
[45] Feb. 1, 1983

[54] DIGITAL DISPLAY DEVICE OF VEHICLE USE

[75] Inventors: Teruo Kawasaki, Yokohama; Hiroyuki Nomura, Fujisawa; Mikio Takeuchi, Yokohama, all of Japan

[73] Assignee: Nissan Motor Co., Ltd., Yokohama, Japan

[21] Appl. No.: 178,007

[22] Filed: Aug. 14, 1980

[30] Foreign Application Priority Data

Aug. 24, 1979 [JP] Japan .................................. 54-107182

[51] Int. Cl.³ .......................... B60Q 1/54; B60R 21/00
[52] U.S. Cl. ........................................ 340/62; 180/171; 180/281; 340/52 R; 340/53; 340/670; 340/715
[58] Field of Search ................. 340/52 R, 52 B, 52 D, 340/52 F, 62, 670, 715, 753, 758, 760, 794, 53, 326; 307/10 AT; 180/171, 178, 281

[56] References Cited

U.S. PATENT DOCUMENTS

| | | | |
|---|---|---|---|
| 3,141,093 | 7/1964 | Solomon | 340/760 X |
| 3,213,441 | 10/1965 | Shook | 340/758 |
| 3,812,403 | 5/1974 | Gartner | 307/10 AT X |
| 3,835,382 | 9/1974 | Weisbart | 340/670 X |
| 4,003,019 | 1/1977 | Tronel | 340/52 F |
| 4,031,510 | 6/1977 | King | 340/62 |
| 4,086,563 | 4/1978 | Bachman | 340/52 B |

Primary Examiner—John W. Caldwell, Sr.
Assistant Examiner—Joseph E. Nowicki
Attorney, Agent, or Firm—Lane, Aitken, Kice & Kananen

[57] ABSTRACT

The digital display device of a vehicle is provided with a control facility for controlling other vehicle mounted electric equipment such as a warning device, an autodoor lock mechanism, or the like. The control is effected by using a control signal intended for turning on a particular segment of an indicating portion of the digital display indicator.

8 Claims, 2 Drawing Figures

DIGITAL DISPLAY DEVICE OF VEHICLE USE

BACKGROUND OF THE INVENTION

The present invention relates to a digital display device of a vehicle used for providing a digital display of information such as vehicle speed or the like.

The conventional display devices of vehicles in general use are of the pointer display type. As for example in a speedometer, it is necessarily requested under regulations to provide a vehicle speed warning device by arranging a yellow zone on the dial at a portion, for instance, indicating speeds over 100 km/h or by installing a housed contact for detecting excess speed of over 100 km/h to ring a warning chime in order to warn the driver that the vehicle speed then exceeds said certain limit, for instance, 100 km/h.

Recently the digital type display devices are increasingly used on vehicles. Accordingly in case such a digital display device is used as the vehicle speedometer, it is necessary to provide a warning display to invite attention that the vehicle speed exceeds a certain limit such as 100 km/h or to operate an excess speed warning device just the same as a conventional analog type mechanical speedometer.

It is also conventional practice to automatically lock the door or to release the exhaust gas recirculation system when the vehicle speed reaches at a certain value.

In the case of a speedometer of the digital display type, for providing the warning of excess speed or to control other vehicle mounted electric or electronic devices as mentioned above, it is not possible simply to arrange the yellow zone on the dial as in the case of the pointer display meter or to arrange a contact operated in a ON-OFF manner by the pointer and hence it is required to provide a vehicle speed detecting circuit for generating a control signal at a predetermined vehicle speed. This has the disadvantage that the circuit arrangement is complicated.

SUMMARY OF THE INVENTION

The present invention is to improve the aforementioned problems of the conventional digital display devices.

In accordance with the present invention, a signal for controlling the turning on of a particular segment among a number of segments of a display indicator in a digital display device used in vehicle is derived and by using this signal, an alarm device relating to the indicated value and other vehicle mounted electric devices are controlled. This digital display device is able to control the necessary warning related to the indicating value such as an excess speed device and to control other required electric devices on the vehicle without providing a particularly complicated circuit such as a vehicle speed detecting circuit.

The display indicating means of the digital display device according to the present invention may be either of various types such as a phosphorescent display tube, a luminescent diode, a liquid crystal, an electro-luminescent, or the like. Therefore, the term "turning on" used throughout the whole specification should be understood to include a display device being able to provide visual display using physical or chemical variation by an electric conduction.

DESCRIPTION OF THE PREFERRED EMBODIMENT

The invention will now be explained by referring to the accompanying drawings.

Figure 1:
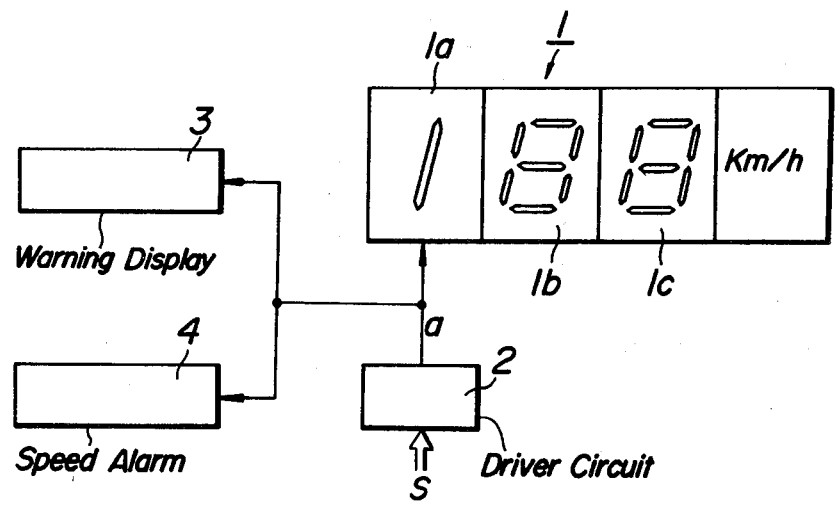
FIG. 1 is a simplified diagram showing digital display type speedometer applied with the present invention.

FIG. 1 is a diagrammatic illustration of an embodiment of the present invention applied in the context of a speedometer. In this figure, reference numeral 1 generally designates a digital vehicle speed indicator for indicating the vehicle speed. It comprises indicating portion 1a of one segment for indicating centenary digit, and indicating portions 1b and 1c both formed of seven segments for indicating decimal and unit digits, respectively.

A driver circuit 2 for obtaining an output signal a, which turns on the indicating portion 1a is provided. This driver circuit 2 is fed with a decimal signal S sent from a decoder (not shown), which detects the vehicle speed and supplies the output signals for controlling the turning on of the respective one of the indicating portions 1a, 1b and 1c. Based on the decimal signal S, the driver circuit 2 supplies the signal a for turning on the single segment of the indicating portion 1a. For each one of the other indicating portions 1b and 1c, a driver circuit for controlling the turning on of the segments is provided but these circuits are not shown in the drawing for simplicity.

A warning display 3 provides a warning in the form of an illuminated yellow warning light when the signal a is supplied from the driver circuit 2. A vehicle speed alarm 4 provides a warning by ringing a chime tone, also when the signal a is supplied.

Operation of this embodiment will be explained hereinafter. The indicating portion 1a is turned on whenever the vehicle speed exceeds a certain limit, for instance, 100 km/h. Accordingly, the driver circuit 2 delivers the signal a for turning on the indicating portion 1a whenever the vehicle speed exceeds 100 km/h. This signal a sent from the driver circuit 2 is, at the same time, supplied to the respective inputs of the warning display 3 and the speed alarm 4. By this signal a, the warning display 3 turns on the yellow warning light and the speed alarm 4 rings the chime to provide a warning to the driver that the vehicle speed now exceeds 100 km/h.

Instead of providing the warning display 3 separately, it is possible to use an indicator which varies its luminous colour in response to the applied voltage for the vehicle speed indicator 1 itself. For instance, the luminance colour of the vehicle speed indicator 1 itself can be switched from green to yellow by the delivery of the signal a from the driver circuit 2.

It is also possible to arrange for automatically releasing the setting of an auto-speed control system (ASCD), which functions to maintain the vehicle speed irrespective to the degree of depression of the accelerator pedal, when the vehicle speed reaches a limit value of 100 km/h in a same manner as described above and by using the kind of signal a for turning on the indicating portion 1a obtained from the driver circuit 2.

Figure 2:
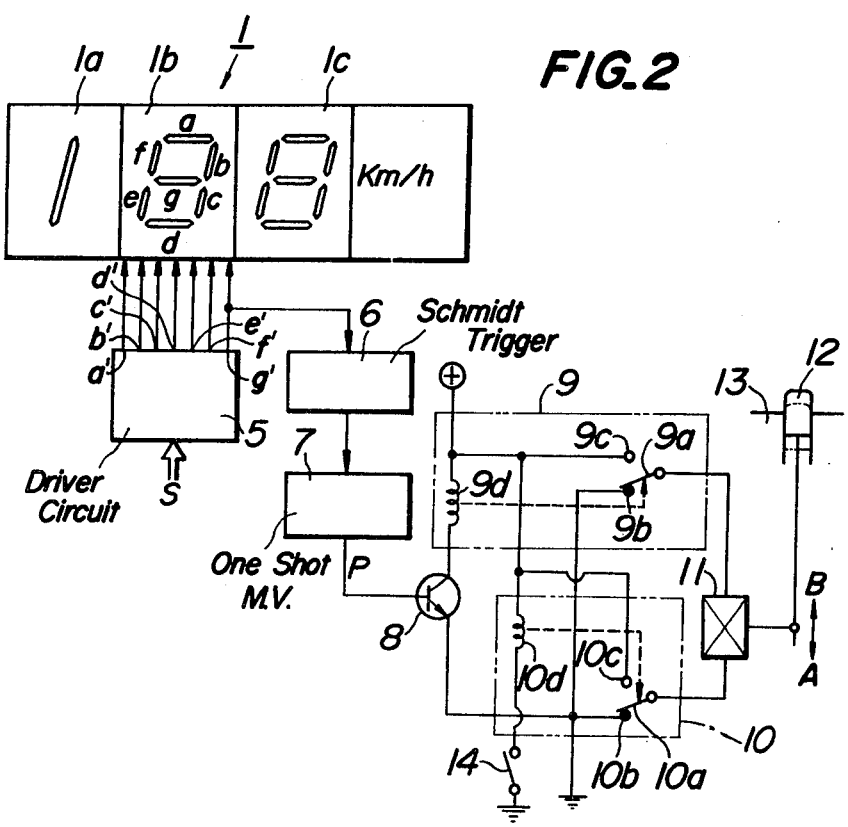
FIG. 2 is a circuit diagram of a modified embodiment of the present invention applied to a digital speedometer.

FIG. 2 shows a modified embodiment of the present invention. This circuit is for controlling the automatic door locking system of a vehicle speed responsive type by using the signal of the driver circuit for turning on an indicating portion of the speedometer. The same parts with that shown in FIG. 1 are illustrated by using the same reference numerals and a duplicated explanation in detail is omitted.

In the figure, reference numeral 5 is a driver circuit for turning on an indicating portion 1b providing an indication of decimal digit of the vehicle speed indicator and having 7 segments. This driver circuit 5 delivers signals a' to g' for turning on corresponding segments of a to g of the indicating portion 1b based on a decimal signal S matching with the vehicle speed sent from a decoder (not shown) in the same manner with the foregoing embodiment. Among these signals a' to g', the signal g' for turning on the segment g is branched and supplied to base of a transistor 8 via a Schmidt trigger circuit 6 and a one-shot multivibrator 7.

Reference numeral 9 indicates a locking relay having a switching contact 9a, two stationary contacts 9b and 9c and a relay coil 9d. An unlocking relay 10 is provided which includes a switching contact 10a, stationary contacts 10b and 10c, and a relay coil 10d. A rotary actuator 11 with a circuit breaker is provided and is coupled to a locking knob 12 of doors 13 along with an unlock switch 14.

The operation of the illustrated embodiment will be given hereinafter. The segment g of the indicating portion 1b of the vehicle speed indicator 1 is first turned on when the vehicle speed reaches 20 km/h. Accordingly, at such a time when the vehicle speed reaches 20 km/h, the driver circuit 5 first delivers the signal g' for turning on the segment g of the indicating portion 1b and the signal g' is supplied to the Schmidt trigger 6 simultaneously. This signal g' is waveform shaped therein and by its leading edge it triggers the one-shot multivibrator 7, which then delivers a signal P of a certain pulse width. This signal P is fed to the base of the transistor 8 and this transistor 8 is turned on for a certain period.

By this turning on, a current flows through the relay coil 9d of the locking relay 9 and the switching contact 9a is switched from the stationary contact 9b to that of the 9c side. Then the rotary actuator 11 is energized and it operates to pull the locking knob 12 in the direction of arrow A. By this movement the door 13 is locked. The locking relay 9 is turned off after a lapse of a certain time and the switching contact 9a returns to the side of the stationary contact 9b. However, the rotary actuator 11 remains in the locked condition until it is supplied with a voltage of reverse direction.

For releasing the locking knob 12, the unlock switch 14 is operated manually. By this on condition of the switch 14, the relay coil 10d of unlock relay 10 is energized and the switch contact 10a is switched from the stationary contact 10b to the stationary contact 10c. Then the rotary actuator 11 is supplied with a voltage of reverse direction and it actuates the knob 12 in the direction of arrow B and the door 13 is now unlocked.

The segment g of the indicating portion 1b of the vehicle speed indicator remains in the turned on condition at a speed between an order of 20 to 60 km/h so that even if the vehicle speed suddenly jumps up from an order of 10 km/h to an 30 km/h order while skipping the 20 km/h order by sudden acceleration, or to the 40 km/h order, the driver circuit 5 will deliver the signal g' for turning on the segment g of the indicating portion 1b and accordingly the door will be locked definitely.

By using this embodiment, it is also possible to control the release of the exhaust gas recirculation system when the vehicle speed reaches a certain value, for instance 50 km/h.

Furthermore, the present invention is not limited to an application of the speedometer. It may equally be applied to a tachometer, a voltmeter, or a fuel amount indicator of digital display type so as to produce an alarm when a particular value is indicated or to control other devices at such occasion.

As has been explained by referring to the practical embodiments of the present invention, the alarm device or other vehicle mounted electric equipment may be controlled by using a signal for controlling the turning on of a particular segment among the segments of an indicator of the digital display device so that a particular circuit for deriving the control signal is not required and the vehicle mounted electric devices may be controlled very easily according to the present invention.

More especially, the present invention is quite effective to provide an alarm indication or to send an alarm when the speedometer indicates a certain speed such as 100 km/h.

What is claimed is:

1. A digital device for a vehicle for indicating basic information related to the vehicle, including indicating the speed of the vehicle, and provided with a function to control vehicle mounted electrical devices including a speed alarm based on said basic information of the vehicle, the device comprising in combination:
   a digital speedometer having indicating portions for respective decimal digits of which each indicating portion comprises at least one segment for visually defining the shape of one or more decimal numbers in a decimal digit, and
   a driver circuit associated with each of said indicating portions for sending control signals for turning on the respective segments to provide a digital display of the speed of the vehicle, said driver circuit including means supplying on one control wire leading from said driver circuit a unitary control signal to a particular segment to turn on said particular segment when the speed of said vehicle exceeds a certain limit, and including circuit means branching said unitary control signal and supplying the branched unitary control signal to said speed alarm to activate said speed alarm whenever said unitary control signal is supplied on said one wire to turn on said particular segment.

2. A digital display device as claimed in claim 1, wherein the particular segment of the particular indicating portion is one for displaying a centenary digit.

3. A digital display device as claimed in claim 1, wherein the vehicle mounted electric device is a speed warning display.

4. A digital display device as claimed in claim 1, wherein the vehicle mounted electric device is a speed alarm.

5. A digital display device as claimed in claim 1, wherein the vehicle mounted electric device is a visible speed warning display and an audible speed alarm.

6. A digital display device as claimed in claim 1, further including an automatic door lock mechanism, circuit means branching a second one of said control signals operable to turn on a second one of said segments when the speed of said vehicle reaches a value which is less than the vehicle speed at said certain limit and supplying the branched second one of said control signals to said automatic door lock mechanism to actuate said door lock mechanism whenever said second one of said control signals turns on said second one of said segments.

7. A digital display device for a vehicle for indicating basic information related to the vehicle including indicating the speed of the vehicle and provided with a function to control vehicle mounted electrical devices including an automatic vehicle lock based on said basic information of the vehicle, the device comprising in combination:

a digital speedometer having indicating portions for respective decimal digits of which each indicating portion comprises at least one segment for visually defining the shape of one or more decimal numbers in a decimal digit, and a driver circuit associated with each of said indicating portions for sending control signals for turning on the respective segments to provide a digital display of the speed of the vehicle, said driver circuit including means supplying on one control wire leading from said driver circuit a unitary control signal to a particular segment to turn on said particular segment when the speed of said vehicle reaches a certain value, and including circuit means branching said unitary control signal and supplying the branched unitary signal to said automatic door lock mechanism to actuate said automatic door lock mechanism when said unitary control signal is applied on said one wire to turn on said particular segment.

8. A digital display device as recited in claim 7, wherein said particular segment is one of a plurality of segments for digitally defining in different combinations the shape of a plurality of decimal numbers for one of said digits.

* * * * *